United States Patent
Larsen et al.

(10) Patent No.: US 8,018,083 B2
(45) Date of Patent: Sep. 13, 2011

(54) HVDC CONNECTION OF WIND TURBINE

(75) Inventors: Einar Vaughn Larsen, Ballston Lake, NY (US); Robert William Delmerico, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/850,803

(22) Filed: Aug. 5, 2010

(65) Prior Publication Data

US 2011/0141773 A1  Jun. 16, 2011

(51) Int. Cl.
*F03D 9/00* (2006.01)
*H02P 9/04* (2006.01)

(52) U.S. Cl. .......................................... 290/44; 290/55

(58) Field of Classification Search ............... 290/43, 290/44, 54, 55; 322/37; 307/84
See application file for complete search history.

(56) References Cited

U.S. PATENT DOCUMENTS

| | | | |
|---|---|---|---|
| 5,798,631 A * | 8/1998 | Spee et al. ...................... 322/25 |
| 6,437,996 B1 | 8/2002 | Wobben | |
| 7,405,490 B2 * | 7/2008 | Moehlenkamp ................ 290/44 |
| 7,417,333 B2 * | 8/2008 | Miller et al. .................... 290/44 |
| 7,622,815 B2 * | 11/2009 | Rivas et al. ..................... 290/44 |
| 7,629,705 B2 * | 12/2009 | Barker et al. ................... 290/55 |
| 7,786,608 B2 * | 8/2010 | Menke ............................ 290/44 |
| 7,939,970 B1 * | 5/2011 | Walling et al. ................. 307/84 |
| 7,948,102 B2 * | 5/2011 | Schubert et al. ............... 290/44 |
| 2007/0279815 A1 | 12/2007 | Li et al. | |
| 2009/0140706 A1 | 6/2009 | Taufik et al. | |
| 2010/0142237 A1 | 6/2010 | Yuan et al. | |

* cited by examiner

*Primary Examiner* — Nicholas Ponomarenko
(74) *Attorney, Agent, or Firm* — Dority & Manning, P.A.

(57) ABSTRACT

A method and apparatus for connection of a wind driven turbine generator to an HVDC transmission line is provided that does not require transformation of the wind generated AC voltage to a nominal AC distribution grid frequency. An AC output from the turbine generator is increased in level and converted to HVDC for direct application to a HVDC transmission line. The wind turbine generated AC may be first increased in frequency via a matrix converter and then rectified or may be first rectified and increased in level by a high-voltage DC-DC converter circuit and then applied directly to the HVDC transmission line.

15 Claims, 4 Drawing Sheets

FIG. 1 - Prior Art

HVDC CONNECTION OF WIND TURBINE

FIELD OF THE INVENTION

The present invention relates generally to the field of wind generators, and, more particularly, to methods and systems to allow for improved power transmission from wind generator sites through creation of on site HVDC transmission level voltage.

BACKGROUND OF THE INVENTION

Existing wind turbines include an inverter that regulates ac voltage in synchronism with the AC grid, connected via a step-up transformer operating at the grid frequency. FIG. 1 shows a typical such grid connected wind power generating system 10. The system includes a wind generator 12, a generator side converter 14 and a grid side converter 16. The system further includes a grid side controller 18, a generator side controller 20 and a power grid 22. A direct current (DC) link 28 connects the generator side converter 14 and the grid side converter 16. The generator side converter 14 converts alternating current (AC) power generated by the wind generator 12 into DC power. The grid side converter 18 then converts the DC power to AC power at a frequency compatible with the power grid 22.

The combination of the grid side controller 18 and grid side converter 16 functions as a current source for the grid 22. In other words, the grid side controller 18 controls the phase and amplitude of the output current of grid side converter 16. The generator side controller 20 generates switching signals for the generator side converter 14. In some embodiments, a turbine controller 38 provides a torque reference T to the generator side controller 20 based on wind velocity or rotor speed of the wind turbine. The turbine controller 38 generates the torque reference such that maximum energy is captured from the wind using, in part, Maximum Power Point Tracking (MPPT) circuitry. Active power control of the wind power generating system 10 of FIG. 1 maintains the output current of the wind turbine 42 by adjusting the phase angle of the AC voltage applied to the grid 22 via transformer 50.

Recently it has become advantageous in certain instances to convert the output previously applied to the AC distribution grid 22 to DC for transmission from, for example, offshore wind farms via subsea cables. In exemplary configurations, the need to convert the normally generated AC voltage to DC for transmission is met by coupling rectifiers to the output side of transformer 50 at the generator site and coupling the rectifier output to a DC transmission line. The addition of further components at the generator site, particularly in the case of offshore installations, however, presents additional challenges at least in view of the additional space and cost required for such devices.

Thus, there is a need for a method and system to reduce the number of conversion components and costs required to produce direct current at a suitable level for application to a DC transmission line.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a method for high voltage direct current (HVDC) connection of wind turbines for power transmission independently of an AC grid. The wind driven generator is configured to produce a variable frequency AC voltage output. The method provides for increasing the generated voltage level sufficiently to provide power to a HVDC transmission line.

The method also provides for converting the voltage to DC and applying the voltage to a HVDC transmission line. In some embodiments the voltage level is first increased from one AC voltage level to a higher AC voltage level and then rectified before applying the voltage to the HVDC transmission line.

In other embodiments, the voltage from the wind driven generator is converted to a DC voltage by an AC-DC converter and then boosted to a higher level by a high-voltage DC-DC converter before being applied to the HVDC transmission line.

In certain embodiments a matrix converter is used to convert the voltage from one AC frequency to a higher AC frequency. In certain of these embodiments, the higher frequency level is further applied to a step up transformer to increase the voltage level. The stepped high frequency voltage may then be rectified before being applied to a HVDC transmission line. In each exemplary embodiment, no conversion to a nominal AC distribution frequency (eg., 50 or 60 Hz) is required.

Another exemplary embodiment of the present disclosure is directed to apparatus for connection of a variable frequency AC producing wind turbine generator for power transmission to a HVDC transmission line independently of an AC grid. The apparatus includes a voltage level increaser and an AC-DC converter interconnected so as to receive a variable AC output from the wind turbine generator and apply HVDC power directly to an HVDC transmission line.

In some embodiments the voltage level increaser is a matrix converter and step up transformer configured to convert the AC voltage from the wind driven turbine generator to a higher-level AC voltage and the AC-DC converter is a rectifier coupled to the output of the matrix converter.

In other embodiments the voltage level increaser is a high-voltage DC-DC converter circuit that receives a DC input from an AC-DC converter. The AC input from the AC-DC converter is supplied from the wind driven turbine generator. In embodiments employing the high-voltage DC-DC converter, the HVDC output of the high-voltage DC-DC converter may be connected directly to the HVDC transmission line.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
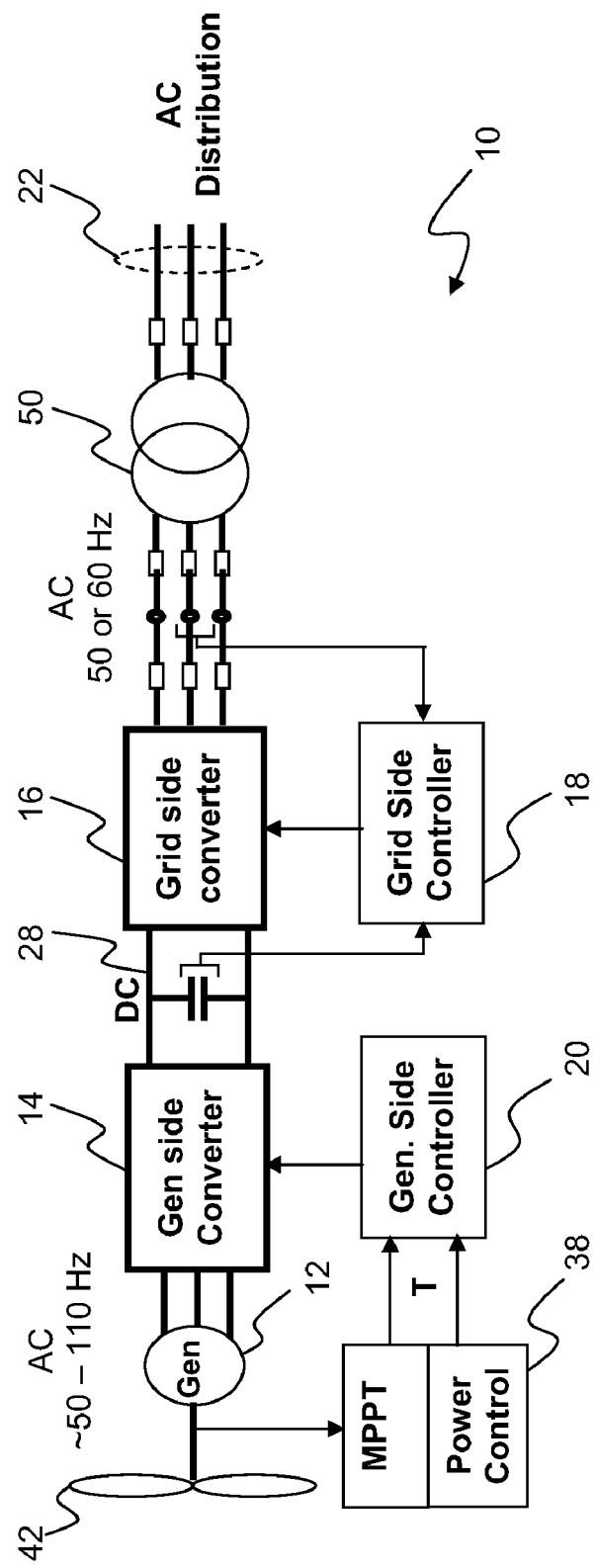
FIG. 1 is a diagrammatical representation of a conventional wind power generating system connected to a power grid.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

With reference now to the present subject matter, it is noted that existing turbines generally are designed to connect to an AC grid with a nominal voltage between 10 k $V_{AC}$ and 35 k $V_{AC}$. Of course the grid side converter 16 and transformer 50 (FIG. 1) must operate at the same frequency as the grid, typically 50 Hz or 60 Hz. The AC grid itself may correspond to many miles of cables and additional transformers.

For long distance cable transmission of wind-generated power, e.g. greater than 50 miles, the cost of the transmission system is lower if HVDC cables are used; however there is a challenge in connecting the wind turbines to the HVDC cables. Existing methods involve creating an AC grid at the remote location, then providing one HVDC converter station and line for the long portion of the transmission.

In accordance with the present subject matter, however, the present technology eliminates the need for a local AC network and HVDC converter station. In addition, because the present technology also removes the restriction of operating the inverters at the grid frequency, it is possible to reduce the cost, size and weight of the magnetic components, particularly the inverter transformer, by operating at a higher frequency. This has the potential to yield a lower overall cost of the complete system including power transmission to a load center.

Figure 2:
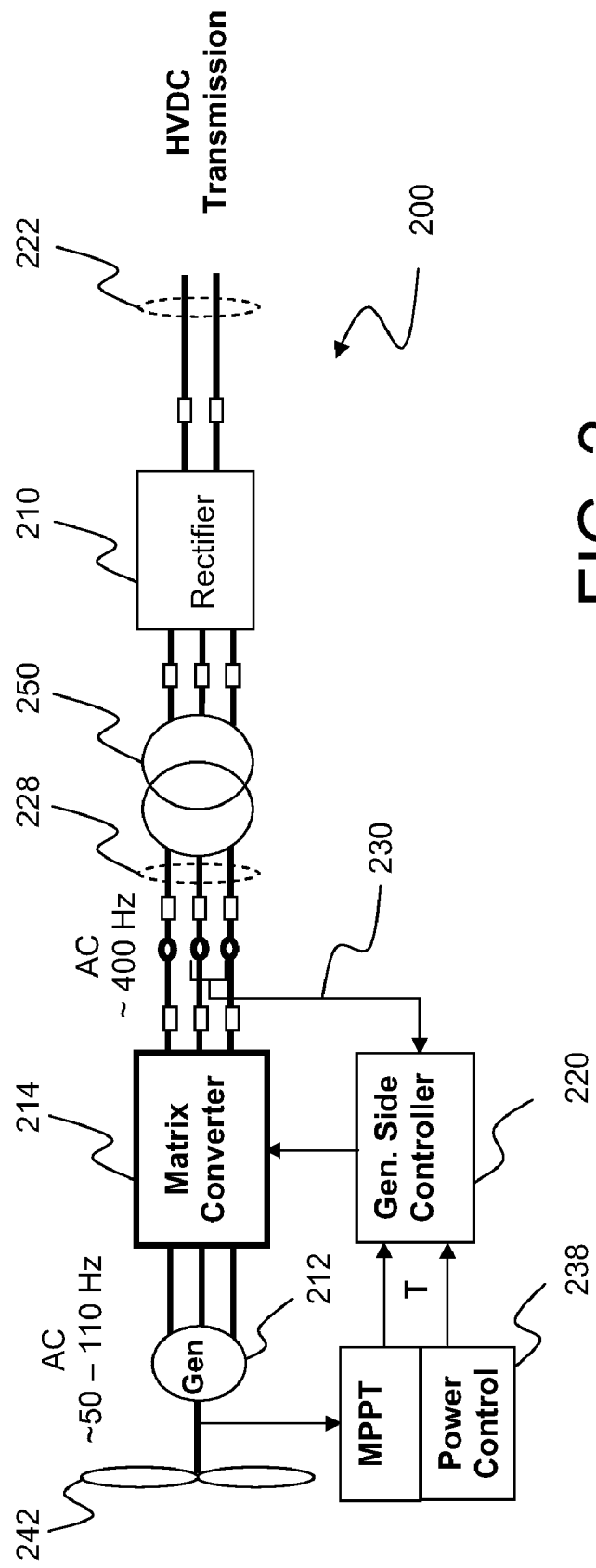
FIG. 2 is a diagrammatical representation of an AC-AC-DC conversion system in accordance with a first exemplary embodiment of the present subject matter.

With reference now to FIG. 2, there is illustrated a diagrammatical representation of an AC-AC-DC conversion system 200 in accordance with a first exemplary embodiment of the present subject matter. It will be apparent from a comparison with FIG. 1 that the embodiment illustrated in FIG. 2 includes a similar wind turbine 242, wind driven generator 212, and a generator side controller 220 receiving controlling signals from power controller 238. In this embodiment of the present subject matter, however, a matrix converter 214 is provided that is configured to directly convert the nominal 50 to 110 Hz AC output of generator 212 directly to a higher frequency AC voltage and supply such AC voltage to bus 228.

In an exemplary configuration, the higher frequency AC voltage may be provided at about 400 Hz and the matrix converter may correspond to one as described, for example, in "Novel Three-Phase AC-AC Sparse Matrix Converters" by Kolar et al.; Power Electronics, IEEE Transactions on Volume 22, Issue 5, September 2007 pages 1649-1661. As is understood by those of ordinary skill in the art, a matrix convert has some operation similarities to the combined operation of a generator side converter and grid side converter such as converters 14 and 16 (FIG. 1) but lacks an energy storage element such as the capacitor bridging DC bus 28 of FIG. 1.

The higher frequency AC voltage applied from matrix converter 214 to bus 228 may then be applied to transformer 250 that, because of the higher operating frequency, may be constructed at reduced cost at least in part on the basis of required magnetic components. Active power control may be achieved by adjusting the AC voltage at bus 228 by supplying a signal via line 230 to generator side controller 220 representative of the bus 228 voltage.

It should be appreciated that while FIG. 2 illustrates a three-phase matrix converter 214 supplying three-phase AC at approximately 400 Hz, other configurations are possible and anticipated by the present subject matter. For example multi-phase AC may be generated at about 400 Hz or other appropriate frequencies.

Further with respect to FIG. 2, it will be seen that a rectifier 210 is provided to receive the stepped up AC output of transformer 250 and supply rectified current to HVDC bus 222. In this regard, transformer 250 may also be configured with multiple windings and/or with multiple windings with series connected rectifiers to correspond to illustrated rectifier 210.

In an exemplary configuration as described with respect to FIG. 2, the three-phase AC voltage at bus 228 from matrix converter 214 may be in the range of 1400 $V_{RMS}$ at a frequency of about 400 Hz. As previously noted, the amplitude of this voltage is adjusted to regulate the real power flow from the generator. The voltage at HVDC bus 222 typically may be on the order of 50 k $V_{dc}$. In exemplary embodiments, rectifier 210 may correspond to a simple diode bridge, or a phase-controlled thyristors bridge while the output of transformer 250 will typically be above 50 k $V_{ac}$ so that power will flow from transformer 250 to HVDC grid.

Figure 3:
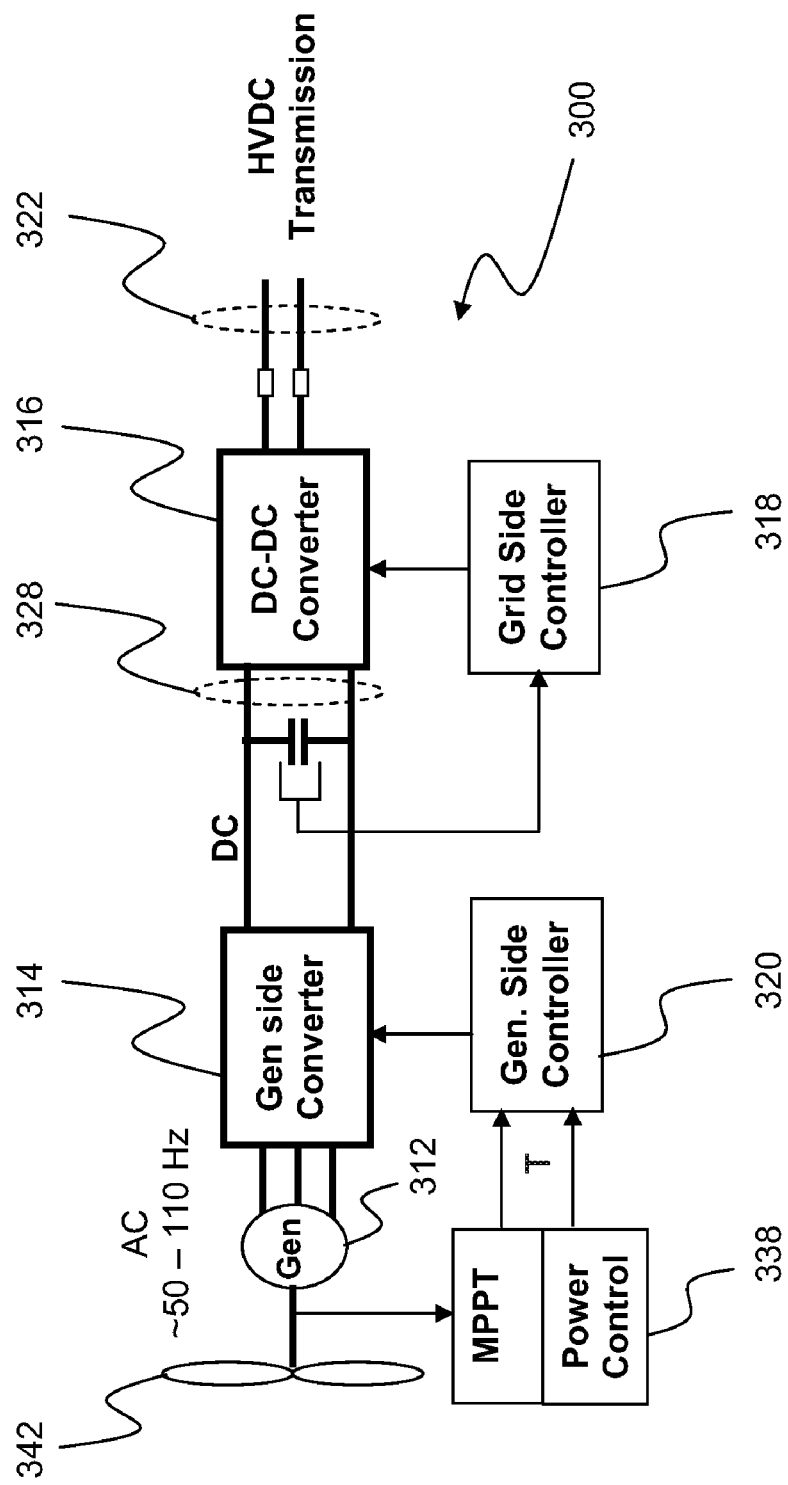
FIG. 3 is a diagrammatical representation of an AC-DC-DC conversion system in accordance with a second exemplary embodiment of the present subject matter; and, FIG. 4 is a diagrammatical representation of an AC-DC-DC conversion system in accordance with a third exemplary embodiment of the present subject matter.

With respect now to FIG. 3 there is illustrated a diagrammatical representation of an AC-DC-DC conversion system 300 in accordance with a second exemplary embodiment of the present subject matter. Conversion system 300 is similar in some aspects to conversion system 10 (FIG. 1) in that there is provided a turbine 342 driving a generator 312 which supplies variable frequency AC power to a generator side converter 314. The supplied power from generator 312 may be AC in the range of 50 to 110 Hz.

A controller 338 supplies control signals to generator side converter 314 in a manner similar to that of controller 38 to generator side converter 20 as described previously with respect to FIG. 1. Similarly also as with respect to FIG. 1, the embodiment of FIG. 3 provides a DC bus 328 with included storage element (generally a capacitor—not separately labeled) coupled there across.

Further, in similar fashion to converter 10 of FIG. 1, is provided a grid side controller 318 but in this instance grid side controller 318 monitors the voltage across bus 328 and supplies a control signal to high-voltage DC-DC converter 316. High-voltage DC-DC converter 316 in turn receives the relatively lower DC voltage from bus 328 and raises it directly to a level appropriate for application to HVDC bus 322. high-voltage DC-DC converters are known in the art and may correspond to devices such as disclosed in "High-Voltage DC-DC Converter for New-Generation Electric Locomotives" G. S. Zinov'ev, N. N. Lopatkin, and H. Vais.

In this embodiment of the present subject matter, active power control is provided by adjusting high-voltage DC-DC converter 316's operating frequency and/or duty cycle. In some embodiments, high-voltage DC-DC converter 316 may include a voltage multiplier to assist in obtaining an appropriate HVDC level for coupling to the HVDC bus 322 for transmission to the DC grid. In an exemplary configuration the DC voltage available on DC bus 328 for application to high-voltage DC-DC converter 316 may be on the order of 2500 $V_{DC}$ while the output of high-voltage DC-DC converter 316 and optionally included voltage multiplier is of a proper level to be applied to the nominal 50 k $V_{DC}$ grid without employing a step up transformer.

Figure 4:
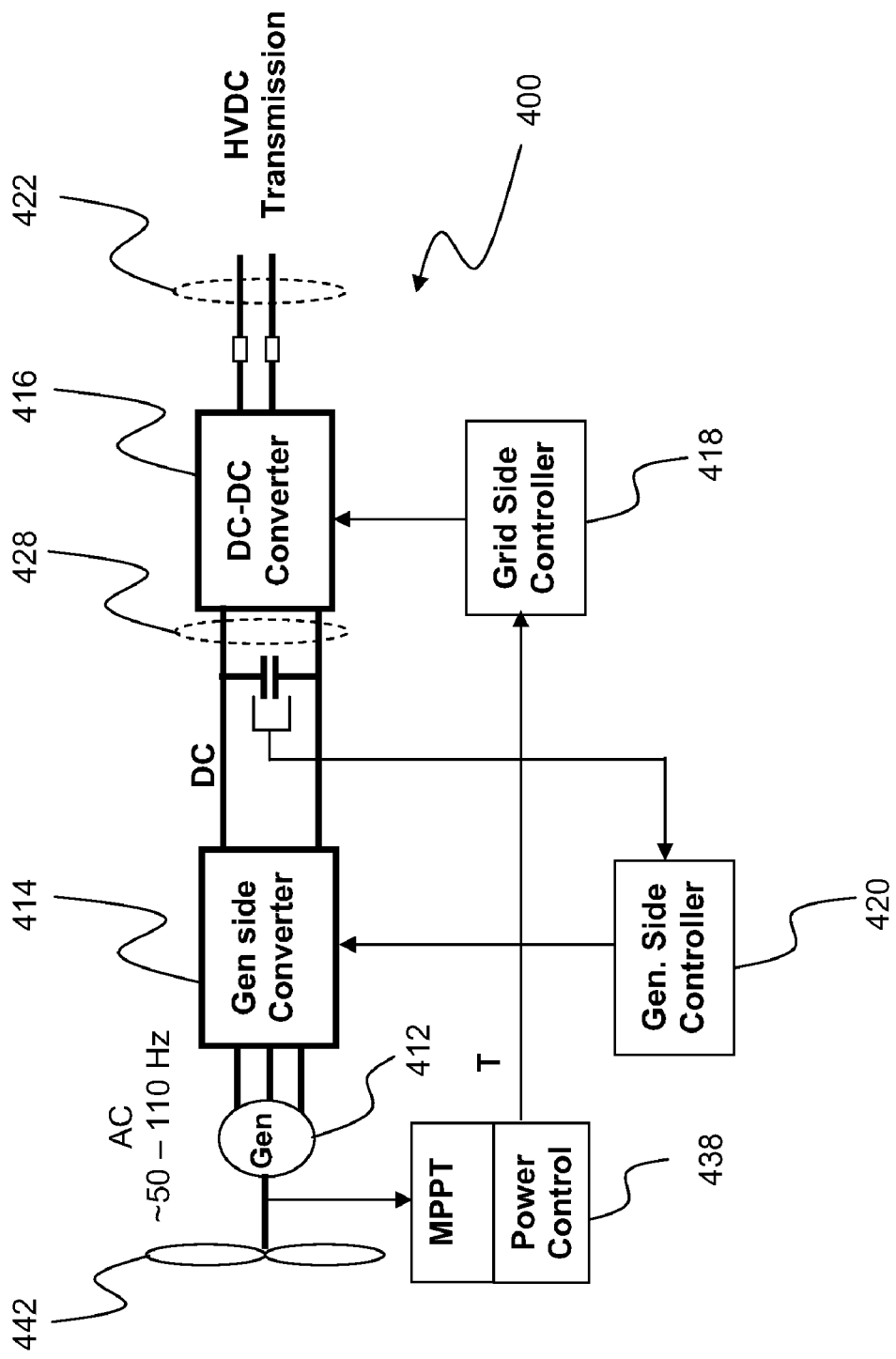

With respect now to FIG. 4 there is illustrated a diagrammatical representation of an AC-DC-DC conversion system 400 in accordance with a third exemplary embodiment of the present subject matter. Conversion system 400 is similar in most aspects to conversion system 300 (FIG. 3) in that there is provided a turbine 442 driving a generator 412 which supplies variable frequency AC power to a generator side converter 414. The supplied power from generator 412 may be AC in the range of 50 to 110 Hz.

In accordance with the embodiment of FIG. 4, controller 438 supplies control signals to grid side controller 418 as opposed to that of controller 338 to generator side controller 320 as described previously with respect to FIG. 3. Similarly also as with respect to FIG. 3, the embodiment of FIG. 4 provides a DC bus 428 with included storage element (generally a capacitor—not separately labeled) coupled there across.

Further, in similar fashion to converter 300 of FIG. 3, there is provided a grid side controller 418 but in this instance grid side controller 418 receives a torque or power signal from MPPT/power control 438 and supplies a control signal to high-voltage DC-DC converter 416. High-voltage DC-DC converter 416 in turn receives the relatively lower DC voltage from bus 428 and raises it directly to a level appropriate for application to HVDC bus 422.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for high voltage direct current (HVDC) connection of wind turbines for power transmission independently of an AC grid, comprising:
    providing a wind driven generator configured to produce a variable frequency AC voltage output;
    increasing the voltage level sufficiently to provide power to a HVDC transmission line;
    converting the voltage to DC; and,
    applying the voltage to a HVDC transmission line.

2. The method of claim 1, wherein increasing the voltage level comprises:
    converting the variable frequency AC voltage from the wind generator to a higher frequency AC voltage; and,
    increasing the voltage level of the higher frequency AC voltage.

3. The method of claim 1, wherein increasing the voltage level comprises:
    converting the variable frequency AC voltage to a higher level DC voltage; and,
    boosting the higher level DC voltage sufficiently to provide power to a HVDC transmission line.

4. The method of claim 1, wherein converting the voltage to DC comprises:
    providing a matrix converter having an input and an output;
    coupling the input of the matrix converter to the variable frequency output of the wind driven generator; and,
    coupling the output of the matrix converter to a rectifier.

5. The method of claim 4, further comprising, coupling the output of the matrix converter to the rectifier by way of a step up transformer.

6. The method of claim 5, wherein the output of the matrix converter is an AC voltage at about 400 Hz.

7. The method of claim 1, wherein converting the voltage to DC comprises, coupling the output of the wind driven generator to an AC-DC converter.

8. The method of claim 7, wherein increasing the voltage level comprises, coupling the DC output of the AC-DC converter to a high-voltage DC-DC converter.

9. The method of claim 8, further comprising, providing an active power control signal to the high-voltage DC-DC converter responsive to the DC output of the AC-DC converter.

10. The method of claim 8, further comprising, providing an active power control signal to the generator side converter responsive to the DC output of the AC-DC converter.

11. Apparatus for connection of a variable frequency AC producing wind turbine generator for power transmission to a HVDC transmission line independently of an AC grid, comprising:
    a voltage level increaser;
    an AC-DC converter; and,
    coupling means configured to couple a variable AC output from the wind turbine generator to the voltage level increaser and the AC-DC converter directly to an HVDC transmission line.

12. Apparatus as in claim 11, wherein the voltage level increaser is a matrix converter and step up transformer configured to convert a first AC voltage to a higher-level AC voltage.

13. Apparatus as in claim 12, wherein the higher level AC voltage is at a higher frequency than the first AC voltage.

14. Apparatus as in claim 11, wherein the AC input voltage to the AC-DC converter is the variable frequency AC produced from the wind turbine generator.

15. Apparatus as in claim 14, wherein the voltage level increaser is a high-voltage DC-DC converter configured to receive a DC voltage from the AC-DC converter and to produce a HVDC for connection to the HVDC transmission line.

* * * * *